Nov. 28, 1961  F. LEIGHTON  3,010,469
LEAK SEALING VALVE FOR FLUID BRAKE SYSTEMS
Filed Feb. 23, 1960  2 Sheets-Sheet 1
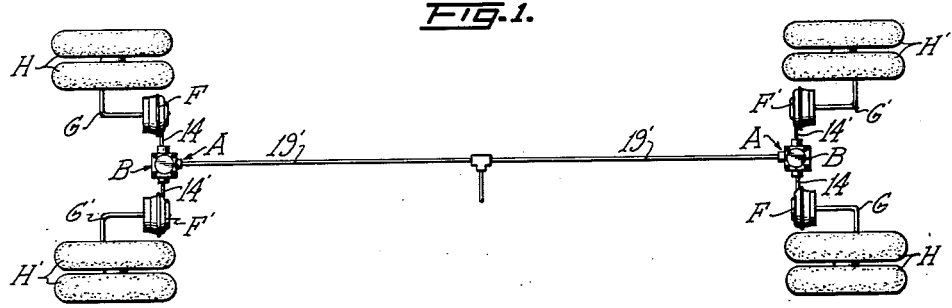
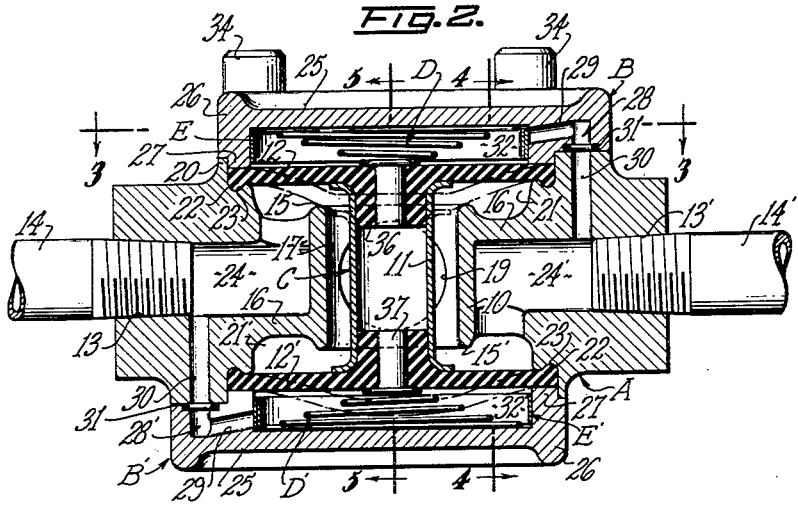
INVENTOR.
FRANCIS LEIGHTON
BY
Lynn W. Latta
ATTORNEY

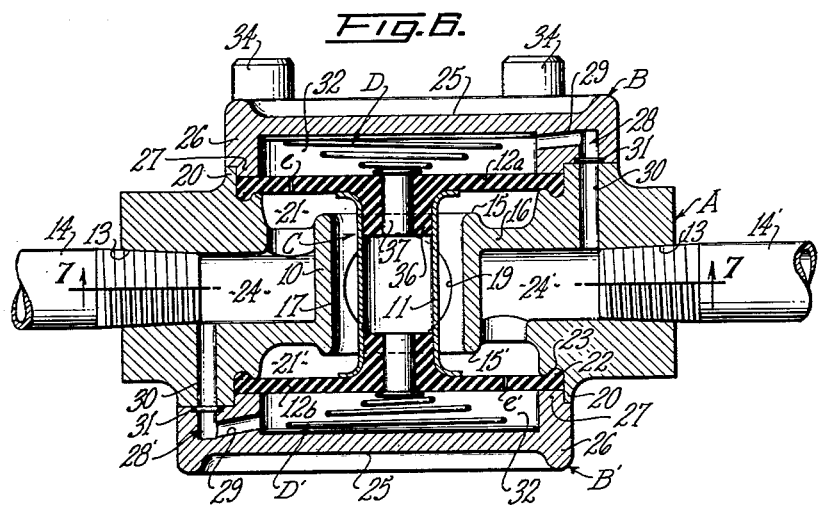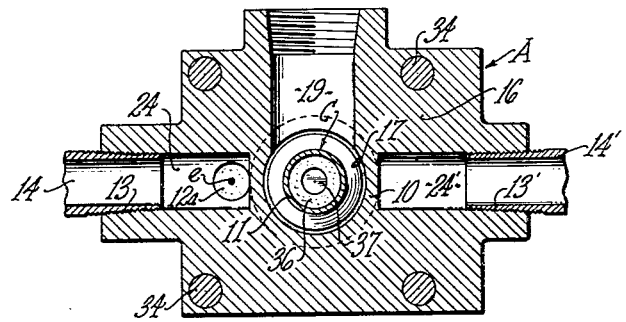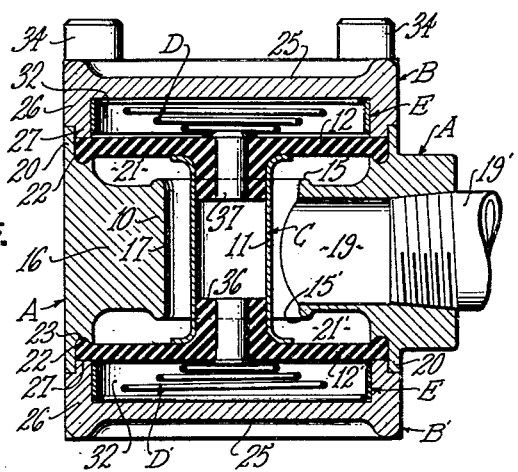

3,010,469
Patented Nov. 28, 1961

3,010,469
LEAK SEALING VALVE FOR FLUID BRAKE SYSTEMS
Francis Leighton, Encino, Calif., assignor to Hydro-Aire Company, Burbank, Calif., a corporation of California
Filed Feb. 23, 1960, Ser. No. 10,498
18 Claims. (Cl. 137—118)

This invention relates to fluid actuated brakes such as pneumatic brakes for automotive vehicles. It is particularly applicable to airbrake systems as used for the braking of commercial transport trucks.

As is well known, in any fluid actuated brake system embodying a plurality of brake lines all responsive to fluid pressure developed by a common pressure source (whether power operated or manual) a leak in any one of the brake lines will result in a loss of pressure in all of the connected brake lines, and, eventually, in complete failure of the brakes. To meet this problem, this invention has as its general object to provide a valve for normally directing fluid under pressure from a pressure source to a brake line, operative in the event of loss of pressure in the brake line arising from a leak therein, to close off that brake line from the source of pressure so as to avoid loss of pressure in the remaining brake lines connected to the source of pressure.

Normally, brake lines are arranged in pairs (a pair for each paired group of wheels on a vehicle) and accordingly a further object of the invention is to provide a dual-outlet valve for normally conveying fluid under pressure from a common source to both of the brake lines of a pair of brake lines, and adapted to close off the connection to either of such pair of brake lines in the event of loss of pressure through a leak therein.

A further object is to provide a novel, improved, symmetrical, compact arrangement of parts in such a dual-outlet leak-sealing valve. More specifically, the invention contemplates such a valve embodying a pair of axially opposed diaphragms and a pair of valve seats spaced inwardly from the respective diaphragms, the inward faces of said diaphragms functioning as valve elements for contact with the respective seats for leak-sealing operation and the outward faces of the diaphragms being subjected to the normal fluid pressure within the valve, with the pressures on the respective diaphragms being normally balanced and the diaphragms correspondingly being in neutral positions equally spaced on opposite sides of a centrally disposed valve seat unit, with the valve correspondingly open on both sides thereof and responsive to any differential between said pressures on the outer faces of the diaphragm, to shift the two diaphragms toward the area of reduced pressure and thereby effect closing of the valve at the side of higher pressure. It is a further object of the invention to provide such an arrangement which is such that the closing thus attained will seal off the brake line in which the leak has occurred.

A further object is to provide such a valve having a novel, compact and effective arrangement of spring loading of both diaphragms to assist the movement of the same in response to a pressure differential.

I have found, during the development of this invention, that it is possible for a valve of this type to respond to pressure differentials which are not caused by leaks. Such a pressure differential may arise, for example, from unequalized adjustment of the two trains of linkage extending from respective fluid pressure responsive brake actuators to the respective sets of brake shoes. If, in a pair of such trains of linkage, there is more lost motion in one train than in the other, the latter will develop its full pressure loading prior to the development of full loading in the linkage of greater looseness in a brake-applying operation. Accordingly, the pressure in the outlet of the valve directing fluid to the actuator with the looser linkage will be momentarily lower than the pressure in the other outlet. It is possible for the valve to fail to distinguish between this momentary pressure differential and the pressure differential caused by an actual leak in one of the brake lines. This momentary pressure differential, arising from unequalized adjustment in a pair of transmitting linkages, may be referred to as a fictitious pressure leak. Where brake linkages are not equalized in adjustment, this may become a major problem, since it obviously is extremely undesirable to permit one brake of a pair of brakes to be inactivated simply because of unequalized adjustment in the pair of actuating linkages.

The valve of my invention is a sensitive valve and will respond to a pressure differential of quite brief duration. Once the valve has seated in response to a momentary pressure differential, the sealing off of the apparently leaking line will preserve the pressure differential, thus inactivating this line for an indefinite period. Accordingly, it will be apparent that the valve should refrain from reaching a closed position on either side in response to any momentary pressure differential.

Accordingly, a major object of this invention is to provide a valve having means for distinguishing between an actual leak and a fictitious leak of the type herein referred to.

More specifically, the invention aims to provide a brake line leak-sealing valve having a time-delay action such that it will distinguish between an actual leak and an apparent or fictitious leak, responding to the actual leak by sealing off the leaking brake line, but refraining from responding to a fictitious leak.

Other objects and advantages will become apparent in the ensuing specifications and appended drawings, in which:

FIG. 1 is a schematic plan view of a four-wheel air brake system embodying two of the valves of my invention;

FIG. 2 is an axial detail sectional view of a valve embodying the invention;

FIG. 3 is a detail sectional view thereof taken on line 3—3 of FIG. 2;

FIG. 4 is a cross sectional view thereof taken on the line 4—4 of FIG. 2;

FIG. 5 is a central cross sectional view thereof taken on the line 5—5 of FIG. 2;

FIG. 6 is a longitudinal sectional view of a valve embodying a modified form of the invention; and FIG. 7 is an axial sectional view taken in a plane at right angles to that of FIG. 6, on the line 7—7 of FIG. 6.

*General description of the invention*

Referring now to the drawings in detail, I have shown in each of the embodiments depicted therein, a leak-closing valve embodying, in general, a housing body A having an integral central tubular part 10 providing a valve seat on each end thereof; a pair of covers B and B' secured to and closing opposite sides of the housing body A; a dual diaphragm unit C embodying a pair of opposed diaphragms 12, 12' and a tubular connecting stem 11; a pair of springs D, D' loading the respective diaphragms; and delayed action means which, in FIG. 2, are in the form of reed valves E, E', which, in the preferred form of the invention shown in FIGS. 6 and 7, consist in bleed apertures e, e' in the diaphragms 12a, 12b. Respective ends of the housing body A are provided with outlet ports 13, 13' adapted for coupling to a respective pair of brake lines 14, 14' for delivering air under pressure from the valve to a pair of pneumatic brake actuators F, F' respectively, from which brake actuating motion is transmitted through mechanical linkages G, G' respectively to the brakes of a pair of wheel units H, H' respectively, shown schematically. It will be understood that the linkages G, G' embody suitable conventional adjustment means for adjusting the brakes. When the adjustments of the two linkages are properly equalized, the simultaneous actuation of the pneumatic actuators F, F' will apply the brakes of both wheel units H, H' simultaneously. When the adjustments are not equalized, the linkage with the greater degree of lost motion will be slower in applying the brakes of its respective wheel unit than the one with the closer adjustment, and the development of full back pressure in the respective actuator F or F', will be correspondingly delayed.

*Detailed description—embodiment of FIGS. 2–5*

Referring now specifically to FIGS. 2–5, the respective ends of tubular part 10 provide respective annular semitoroidal valve seats 15 and 15', projecting beyond the respective sides of a partition web 16 (FIGS. 4 and 5) which bridges across the valve housing A parallel to the diaphragms 12, 12', dividing the space between the two diaphragms except for an annular cylindrical inlet chamber 17 which is defined between the cylindrical inner wall of tubular part 10 and stem 11. The respective ends of chamber 17 constitute valve throats leading to valve seats 15, 15'. In one side of web 16 (FIG. 5) is an inlet 19 adapted for connection to a pressure line 19' leading from a suitable conventional source of brake actuating pressure or fluid pressure. Inlet 19 communicates with the central inlet chamber 17 and delivers air under pressure to a pair of inward pressure chambers 21, 21' defined between the partition web 16 and the respective diaphragms 12, 12', around the respective valve seats 15, 15'. The respective side extremities of housing body A are defined by respective rims 20 which define respective circular diaphragm chambers terminating, at the sides of the body A, in diaphragm openings in which the peripheries of the diaphragms are fitted.

Each of the diaphragms 12, 12' is in the form of a flat circular disc of soft pliable material such as soft rubber, either natural or synthetic, or equivalent soft, flexible synthetic resin plastic (e.g. plasticized thermoplastic) material. Each diaphragm has a rim, preferably thickened by a bead or flange 22 and clamped between the intermediate housing body A and a respective cover B, B', with the rim bead 22 seated in an annular, grooved shoulder 23 in body A. Each shoulder 23 is encircled by a respective rim 20 and inset inwardly from the end thereof to accommodate the thickness of the diaphragm.

The web 16 has its major median plane coincident with the common plane of outlets 14, 14' and inlet 19, and the diaphragms 12, 12', stem 11 and inlet chamber 17 have a common axis normal to this median plane, the diaphragms and valve seats being parallel thereto.

Formed in respective ends of valve body A are L-shaped outlet passages 24, 24', establishing communication between respective annular transfer chamber 21, 21' and outlets 13, 13'.

Each of the covers B, B' embodies a flat head 25 and a rim 26 terminating in a cylindrical lip 27 which is fitted into a respective housing 20 and bears against the rim of the respective diaphragm to secure the same. Outwardly of lip 27, the cover 26 has a flat annular shoulder face which is fitted against a corresponding flat annular side face of valve body A. Through these fitted flat faces of the valve body and covers, extend respective pressure-sensing passages 28, 28', each including an L-passage 29 in a respective cover and a straight passage 30 in a respective end of valve body A. Passage 30 communicates at one end with a respective outlet port 24 or 24' and at its other end with an aligned short leg of a respective L-passage 29 and is sealed thereto by a small O-ring 31 engaged between the housing body A and a respective cover and received in a counterbore in one of these members.

Defined within the respective cover rims 26, and between the heads 25 and respective diaphragms, are respective outward pressure chambers 32, 32'. The pressure chamber 32, adjacent diaphragm 12, communicates with the outlet passage 24' through pressure sensing passage 28, and the pressure chamber 32', adjacent diaphragm 12', similarly communicates with outlet passage 24 through sensing passage 28'. The respective covers B, B' are secured to the valve body A by suitable cap screws or bolts 34.

The diaphragm connecting stem 11 is a short section of tubing, preferably of metal, with its respective ends expanded into heads seated against the inner faces of the respective diaphragms. The diaphragms are provided centrally with respective tubular bosses 36 which are fitted into the respective ends of stem 11 and are plugged by plugs 37 and thereby expanded into tight wedging engagement with the inner wall of stem 11 so as to securely attach the respective diaphragms to the two ends of the stem.

The diaphragm loading springs D are of conically spiralling form, sometimes referred to as "involute," with respective apex rings fitted around the heads of the respective plugs 37 and respective base rings bearing against the cover heads 25.

The flow-delay devices E are in the form of cylindrical split-collar bands with free overlapping ends (FIG. 3), the respective bands being generally fitted to the cylindrical inner walls of the respective cover rims 26 and lightly closing the inner ends of respective L-passages 29 of the respective sensing passages 28, 28'. These collar bands function as reed-valves, obstructing the passage of air between pressure chambers 32, 32' and outlet passages 24', 24 respectively so as to delay the flow of air between respective pressure chambers 32, 32' and outlet passages 24', 24 in the event of a sudden pressure differential developing between the outlet passages 24, 24' respectively.

*Preferred form—FIGS. 6, 7*

The valve as shown in FIGS. 6 and 7, which is a preferred form of the invention since it is somewhat simpler in construction than the valve of FIGS. 1–5, is the same in all respects as that valve (as indicated by corresponding reference characters) with the exception that the delayed action means utilizes small bleed ports e, e' in the respective diaphragms 12a, 12b, instead of the flow restricting valves E, E' of FIGS. 1–5, which valves are dispensed with. The bleed apertures e, e', are quite small in cross sectional area, so as to pass air more slowly than any leak of serious consequence in a brake line. The rate of flow through apertures e, e', is sufficiently slow so that where a leak of any consequence occurs in a brake line, a pressure differential, sufficient to actuate the valve to seal off the leaking brake line, will be established even though a small proportion of leakage will continue to occur by reason of bleed through the diaphragms. The bleed rate through the diaphragms is sufficiently slow to avoid any impairment of operation of the brake which remains active after a leaking brake line has been closed off.

In the preferred arrangement as shown in FIGS. 6 and 7, the bleed apertures e, e', are located in axial alignment with the ends of outlet passages 24, 24' respectively, so as not to be obstructed by sealing of a diaphragm against the partition web 16 in the bottom of a pressure chamber 21 or 21'. The invention also contemplates a further modified arrangement wherein the bleed apertures e, e', are positioned out of registry with the outlet passages 24, 24' so as to further restrict the rate of bleed through the diaphragm as the result of substantial sealing of a diaphragm against the bottom of a respective chamber 21 or 21', the bleeding air being then required to force its way between the engaging inward face of the diaphragm and the surface of web 16 engaged thereby.

Operation

In describing the operation of the valve as shown in FIGS. 2–5, it will be assumed that a leak has developed in the actuator F or its connection 14 to the valve, resulting in a pressure drop in outlet passage 24 as related to the pressure in outlet passage 24'. This pressure drop will be communicated directly from outlet passage 24 to the inward pressure chamber 21 where it will be applied to the inward side of diaphragm 12; and will also be communicated from outlet passage 24 through sensing passage 28' to the outward pressure chamber 32' where it will be applied to the outward side of diaphragm 12'. With the pressure in outward chamber 32 being maintained undiminished by communication with the full pressure in outlet passage 24', as opposed to the lowered pressure in the inward chamber 21, an inwardly directed pressure differential will be developed across diaphragm 12; while the full head of pressure in inward pressure chamber 21' against the inward face of diaphragm 12', as opposed to the lowered pressure against the outward face of this diaphragm, will develop an outwardly directed pressure differential across diaphragm 12'. These pressure differentials on the respective diaphragms will act in the same direction, deflecting the diaphragm 12 inwardly and the diaphragm 12 outwardly (as indicated by the phantom lines in FIG. 2) and causing the diaphragm 12 to seat against the valve seat 15. The seating of diaphragm 12 against its seat 15 will close off communication between the central inlet chamber 17 and the respective transfer chamber 21, thus sealing off the respective outlet passage 24 and brake line connection 14. This brake line is thus taken out of operation, leaving the remaining brake lines fully operative by preserving the pressure within these remaining lines.

So long as the brake actuator linkages are properly equalized in their adjustment, the valve will operate highly satisfactorily for closing off a leaking brake line and maintaining both lines operative so long as a leak does not occur, without the delayed action means E, E' or e, e'. For such operation, the combination of the units A, B, and C constitute a highly improved arrangement of improved sensitivity, compactness, ruggedness and durability arising from the arrangement wherein the two diaphragms are connected by the lightweight stem 11 for unison operation in opposed relation to valve seats which are formed integrally on the opposite ends of the boss 10 which defines the central inlet chamber 17 through which the stem 11 extends. This arrangement further includes the improved arrangement wherein the integral intermediate housing body A is formed with the annular recesses surrounding the respective valve seats and defining the transfer chambers 21, 21' in which the air pressures act against the inward faces of the respective diaphragms; and body A further provides integral means for receiving and clamping the rims of the diaphragms in cooperation with the removable covers B, B' thereby providing the outward pressure chambers 32, 32' and the sensing passages 29 in communication with the respective outlet chambers 24, 24'.

However, I have found that a valve unit of this type, without any delayed action means such as the flow restricting valves E, E' or the bleed apertures e, when used in a system wherein the brake actuator linkages are not equalized, has an objectionable feature of operation in that it may respond to a momentary pressure differential such as that arising from a build-up of pressure in one brake line to a high level prior to build-up of pressure in the other brake line during a brake applying operation; and may in such response reach a closed position of one of the diaphragms against its respective seat. Should this occur, the build-up of pressure in the brake line having the lower pressure responsible for the differential, will be arrested and thus the pressure differential will be preserved or even increased because of the closing off of the brake line of lower pressure. For example, should a momentary pressure differential result in the diaphragm unit C of FIG. 2 reaching the closed position indicated by the phantom lines in that figure, as the result of a momentary increase in pressure in outlet passage 24' over that in outlet passage 24 (assuming an absence of the flow restricting valves E, E' of FIG. 2 so that the momentary pressure differential will be effective to completely shift the valve to such closed position) the closing of diaphragm 12 against its seat 15 will seal off the transfer chamber 21 from the inlet chamber 17 through which the air pressure is being applied, and thus the lower pressure of outlet 24 against the major area of the inward face of diaphragm 12 will be preserved while pressure in outlet 24' continues to build up. Thus, so long as brake actuating pressure is being applied through inlet chamber 17, the momentary pressure differential originating in an imbalance in the actuator linkage will be preserved and intensified, and the brake line 14 will be inactivated throughout that brake applying operation, so that only the brake actuated through line 14' will be applied.

To solve this problem, delayed-action devices E, E' or e, e' are provided. In considering the operation of the valve including such devices, it should first be noted that in order to accommodate the differential pressure responsive movements of the diaphragms to the positions shown in phantom in FIG. 2, air must flow into the chamber 32 through sensing passage 28 and air must leave the chamber 32' through sensing passage 28'. These accommodating flows of the air are restricted and delayed by the flow-restriction valves E, E'. Consequently, the diaphragm deflection movement is delayed sufficiently so that the valve will not respond to a momentary pressure differential (such as would be caused by unequalized actuator linkage adjustment), to a sufficient extent to seat the inwardly deflecting diaphragm against its valve seat, and although a slight deflection may take place, the passing of the pressure differential (taking place when the looser linkage has been taken up and has developed back pressure in setting its respective brakes) will result in restoration of the diaphragm unit C to its neutral position shown in full lines in FIG. 2. On the other hand, the pressure differential resulting from a leak in either of the brake lines will be a sustained one and its sustained effect on the diaphragms will result in the closing off of the leaking brake line.

It may now be noted that the delayed action means E of FIGS. 1–5 is a means for slowing down the response of the diaphragm unit C to a pressure differential so as to prevent it from reaching a closed position; whereas the delayed action means "e" of FIGS. 6 and 7 is a means for unsealing the valve in the event it does reach a closed position in response to a momentary pressure differential, and restoring it to a normal position.

In the operation of the valve of FIGS. 6, 7, should a momentary pressure differential occur as the result of unequalized linkage adjustment, there may be a temporary actuation of the valve to close off the line leading to the actuator with the looser linkage, and even though the diaphragm may establish contact with its seat, temporarily preventing the completion of flow of actuator pressure from the inlet chamber 17 into the brake line that has been closed off, there will be a slow leakage of air from the high pressure chambers of the valve through the bleed apertures into the outlet passage that has been closed off, gradually building up the pressure in the closed off brake line to the point where the brakes will be applied and the pressures within the valves equalized, resulting in the return of the diaphragm unit C to its neutral position. For example, assuming that a momentary pressure differential has been established because of the pressure build-up in brake line 14' preceding the pressure build-up in brake line 14, resulting in the diaphragms being deflected to the positions shown in phantom in FIG. 2, with the diaphragm 12a of FIG. 6 seated against its respective valve seat and closing off the transfer chamber 21 from the outlet passage 24, the lower pressure in this outlet passage will temporarily be preserved because of its being cut off from the inlet chamber 17, thus allowing the pressure in line 14' to be built up to maximum value while the build-up of pressure in line 14 is arrested. Relatively low pressure will now exist in the pressure chambers 21 and 32' and will be applied to the major area of the inward face of the diaphragm 12a and to the outward face of the diaphragm 12b, whereas relatively high pressure will exist in the pressure chamber 32 and in the transfer chamber 21' and will be applied to the outward face of the diaphragm 12a and to the inward face of the diaphragm 12b. Accordingly, air will bleed from these areas of higher pressure inwardly through the upper diaphragm and outwardly through the lower diaphragm into the pressure chambers 21 and 32' respectively and thence into the outlet passage 24 and to the brake line 14, gradually building up the pressure therein until the brakes are applied and pressures in the valve are equalized, the diaphragm unit C then returning to its neutral position.

In its simple form, the invention provides an improved arrangement wherein a pair of axially spaced diaphragms are in opposed relationship to respective valve seats disposed between the diaphragms and spaced inwardly therefrom, wherein pairs of inward and outward pressure chambers are defined on both sides of each diaphragm, wherein pressure fluid is directed through a central inlet chamber and through valve throats at respective ends thereof, wherein outlets and pressure sensing passages are so arranged in communication with the inlet chambers, the inward pressure chambers and the outward pressure chambers, that whenever a pressure drop occurs in either of the outlets, pressure differentials will be imposed upon each of the diaphragm acting in a common direction to effect movement of one of the diaphragms inwardly into engagement with its seat, the diaphragm being constrained to move in unison, by a connecting stem.

I claim:

1. A leak-sealing valve comprising: a housing having an inlet to receive pressure fluid from a source thereof and having a pair of outlets for delivering the pressure fluid, having an inlet chamber communicating with said inlet and a pair of outlet passages each communicating with said inlet chamber and with a respective outlet, having respective annular valve seats at respective ends of said inlet chamber, and having respective diaphragm chambers disposed axially outwardly from respective valve seats; a pair of diaphragms disposed in the respective diaphragm chambers in parallel planes spaced axially outwardly from the respective valve seats with their respective peripheries secured and sealed to said housing and dividing said diaphragm chambers into respective outward and inward pressure chambers for confining pressure fluid in active contact with the respective inward and outward faces of said diaphragms; and a stem extending through said inlet chamber and attached at its respective ends to the respective diaphragms for unison movement thereof; said housing further having pressure sensing passages each communicating at one end with a respective outlet passage and at its other end with the outward pressure chamber which is remote from the inward pressure chamber with which its connected outlet passage communicates, whereby a pressure drop in one of said outlet passages will be communicated to the outward face of one diaphragm and to the inward face of the other diaphragm, resulting in pressure differentials upon both diaphragms, deflecting them in a common direction, one inwardly and the other outwardly, to establish contact of the inwardly moving diaphragm with its respective valve seat, thereby to seal off from said inlet chamber, the outlet passage in which the pressure drop has occurred.

2. A valve as defined in claim 1, including respective diaphragm-loading springs engaged under compression between the outward sides of the respective diaphragm and the opposed outward sides of the housing.

3. A valve as defined in claim 1, including means for restricting flow of pressure fluid in said pressure sensing passages, whereby to delay the response of said diaphragms to avoid sealing off in response to a pressure differential of short duration.

4. A valve as defined in claim 1, wherein each of said diaphragms is provided with a restricted bleed aperture for delayed equalization of pressures in said chambers to unseat a diaphragm that has engaged its seat in response to a pressure differential of short duration.

5. A leak-sealing valve comprising: a housing having a pressure inlet in one side thereof and a pair of outlet passages terminating in pressure fluid delivery outlets at respective ends thereof, said housing including a partition web having a median plane disposed in the common plane of said inlet and outlets and including an integral central tubular part providing at its respective ends, annular valve seats disposed on respective sides of said web and parallel to said median plane, said housing having respective side portions defining respective diaphragm chambers on opposite sides of said web, axially and radially outwardly of said valve seats; a pair of diaphragms traversing the respective diaphragm chambers in planes parallel to said median plane and normally spaced axially outwardly from the respective valve seats, said diaphragms having their peripheries secured and sealed to said housing at the peripheries of said chambers and dividing said chambers into respective inward and outward pressure chambers for confining pressure fluid in operative contact with the respective inward and outward faces of said diaphragm; said tubular part defining inwardly thereof a central inlet chamber extending transversely through said web and communicating with said inlet at one side thereof and with the respective inward pressure chambers at its respective ends; a stem extending axially through said inlet chamber and attached at its respective ends to the central portions of the respective diaphragms for unison operation thereof; said outlet passages each communicating at its inward end with a respective inward pressure chamber for conveying pressure fluid from said inlet chamber to a respective outlet; said housing further having a pair of pressure sensing passages each connected at one end to a respective outlet passage and at its other end to the outward pressure chamber remote from the inward pressure chamber with which its connected outlet passage communicates, whereby a pressure drop in one of said outlet passages will be communicated to the outward face of one diaphragm and to the inward face of the other diaphragm, resulting in a pressure differential upon both diaphragms, deflecting them in a common direction, one inwardly and the other outwardly, to establish contact of the inwardly moving diaphragm with its respective valve seat, thereby to seal off from said inlet chamber, the outlet passage in which the pressure drop has occurred.

6. A leak-sealing valve comprising: a housing having a pressure inlet in one side thereof and a pair of L-shaped outlet passages having coaxial legs terminating in pressure fluid delivery outlets at respective ends of said housing, said housing including a partition web having a median plane disposed in the common plane of said inlet and outlet ports and including an integral central part defining a tubular inlet chamber extending therethrough transversely to said plane and providing at its respective ends, annular valve seats disposed on respective sides of said median plane and parallel thereto, said housing having respective side portions defining respective diaphragm chambers on opposite sides of said partition web, axially outwardly of said valve seats; a pair of diaphragms traversing the respective diaphragm chambers in planes parallel to said median plane and normally spaced axially outwardly from the respective valve seats, said diaphragms having their peripheries secured and sealed to said housing at the peripheries of said chambers and dividing said chambers into respective inward and outward pressure chambers for confining pressure fluid in operative contact with the respective inward and outward faces of said diaphragm; said inlet chamber communicating with said inlet at one side thereof and with the respective inward pressure chambers at its respective ends; a stem extending axially through said inlet chamber and attached at its respective ends to the central portions of the respective diaphragms for unison operation thereof; said outlet passages each having at its inward end a leg extending parallel to said inlet chamber and communicating with a respective inward pressure chamber for conveying pressure fluid from said inlet chamber to a respective outlet port; said housing further having a pair of L-shaped pressure sensing passages each having a leg extending transversely to the common outlet axis and connected to a respective outlet passage and having a leg extending parallel to said common outlet axis and connected to the outward pressure chamber remote from the inward pressure chamber with which its connected outlet passage communicates, whereby a pressure drop in one of said outlet passages will be communicated to the outward face of one diaphragm and to the inward face of the other diaphragm, resulting in a pressure differential upon both diaphragms, deflecting them in a common direction, one inwardly moving diaphragm with its respective valve seat, thereby to seal off from said inlet chamber, the outlet passage in which the pressure drop has occurred.

7. A leak-sealing valve comprising: a valve housing having an inlet in one side thereof intermediate its ends and respective outlets in its respective ends, said housing comprising a partition web having a median plane extending along the axis of said outlets, said housing having respective diaphragm chambers disposed on opposite sides of said web and having a central tubular part extending transversely through said web and providing at its respective ends, annular valve seats disposed in planes parallel to said median plane; a pair of diaphragms mounted in the respective diaphragm chambers, normally in axially opposed, spaced relation to said valve seats and parallel to said median plane, said diaphragms having peripheries secured and sealed to said housings and dividing said diaphragm chambers into respective inward and outward pressure chambers; a stem extending through said tubular part and secured to the respective diaphragms at the centers thereof and linking said diaphragms for unison deflection; said housing having an annular inlet chamber defined around said stem and within said tubular part, said inlet chamber communicating with said inlet and with the respective inward pressure chambers; said housing further having outlet passages each providing communication between a respective outlet and a respective inward pressure chamber on one side of the valve, and having a pair of pressure sensing passages each providing communication between a respective outlet passage and the outward pressure chamber on the other side of the valve, whereby a pressure drop in one of said outlet passages will be communicated to the outward face of one diaphragm and to the inward face of the other diaphragm, resulting in a pressure differential upon both diaphragms, deflecting them in a common direction, one inwardly and the other outwardly, to establish contact of the inwardly moving diaphragm with its respective valve seat, thereby to seal off from said inlet chamber, the outlet passage in which the pressure drop has occurred.

8. A leak-sealing valve comprising: a housing having an inlet to receive pressure fluid from a source thereof and having a pair of outlets for delivering the pressure fluid, having an inlet chamber communicating with said inlet and with respective outlets, having respective annular valve seats at respective ends of said inlet chamber and having respective diaphragm chambers disposed axially and radially outwardly from respective valve seats; a pair of diaphragms spaced axially outwardly from the respective valve seats, within and dividing the respective diaphragm chambers into respective outward and inward pressure chambers for confining pressure fluid in operative communication with the respective inward and outward faces of said diaphragms; said housing further having a pair of pressure sensing passages each communicating at one end with a respective outlet and at its other end with the outward pressure chamber which is remote from the inward pressure chamber with which its connected outlet communicates, whereby a pressure drop in one of said outlets will be communicated to the outward face of one diaphragm and to the inward face of the other diaphragm, resulting in a pressure differential upon both diaphragms, deflecting them in a common direction, one inwardly and the other outwardly, to establish contact of the inwardly moving diaphragm with its respective valve seat, thereby to seal off from said inlet chamber, the outlet in which the pressure drop has occurred.

9. A leak-sealing valve comprising: a pair of diaphragms; a housing in which said diaphragms are mounted at their peripheries, said housing cooperating with said diaphragms to define respective inward and outward pressure chambers for confining pressure fluid in operative communication with the inward and outward faces of said diaphragms respectively; said housing including means between said diaphragms defining a pair of valve throats and a pair of annular valve seats at the outer extremities of the respective valve throats, in inward spaced opposed relation to the inward faces of the respective diaphragms, said housing having an inlet for conveying pressure fluid to said valve throats and a pair of outlets for delivering pressure fluid, and having a pair of pressure sensing passages for communicating pressure fluid to respective outward pressure chambers, each of said outlets communicating with a respective inward pressure chamber on one side of the valve and communicating through a respective pressure sensing passage with the outward pressure chamber on the other side of the valve, whereby a pressure drop in one of said outlets will be communicated to the outward face of one diaphragm and to the inward face of the other diaphragm, resulting in a pressure differential upon both diaphragms, deflecting them in a common direction, one inwardly and the other outwardly, to establish contact of the inwardly moving diaphragm with its respective valve seat, thereby to seal off from said inlet, the outlet in which the pressure drop has occurred.

10. A dual leak-sealing valve comprising: a pair of diaphragms arranged on a common axis in axially spaced relation; a body having an inlet at one side thereof and outlets at respective ends thereof lying in a common plane, for conveying pressure fluid, having respective coaxial diaphragm openings in opposite sides thereof, in which the respective diaphragms are received, including respective diaphragm-seating shoulders within said openings, disposed inwardly of said opposite sides and parallel to said common plane, on which shoulders the rims of said diaphragms are seated, a partition web having a median plane disposed in the common plane of said inlet and outlet and including a central tubular part defining an inlet chamber communicating with said inlet and having its longitudinal axis normal to the said common plane; inward pressure chambers, communicating with the respective ends of said inlet chamber, being defined between said web and the respective inward faces of said diaphragms radially outwardly of said tubular part; and annular valve seats on the respective ends of said tubular part, disposed in planes parallel to and spaced axially inwardly from the planes of said shoulders; and a pair of covers attached to said opposite sides of the housing body, covering said diaphragms and spaced axially outwardly therefrom to define therewith outward pressure chambers communicating with the outward faces of said diaphragms, said covers having respective rims clamping said diaphragm rims against said shoulders and sealing said outward pressure chambers; said housing body further having respective outlet passages providing communication between respective inward pressure chambers and respective outlets, said housing body and cover jointly having therein, pressure sensing passages each providing communication between a respective outward pressure chamber on one side of the valve and the outlet passage which communicates with the inward pressure chamber on the other side of the valve, whereby a pressure drop in one of said outlet passages will be communicated to the outward face of one diaphragm and to the inward face of the other diaphragm, resulting in pressure differentials upon both diaphragms, deflecting them in a common direction, one inwardly and the other outwardly, to establish contact of the inwardly moving diaphragm with its respective valve seat, thereby to seal off from said inlet chamber, the outlet passage in which the pressure drop has occurred.

11. A valve as defined in claim 10, including respective diaphragm-loading springs engaged under compression between the outward sides of the respective diaphragms and the opposed covers, said springs being of involute form, having their apexes seated against the centers of respective diaphragms and their peripheral portions seated against the respective covers.

12. A valve as defined in claim 10, wherein each cover rim has a cylindrical inner wall, said pressure sensing passages being of L-shape, each including a leg extending outwardly parallel to the diaphragm axis and a leg extending through a respective cover rim and terminating in an opening in said cylindrical inner wall, said valve further including means for restricting flow of pressure fluid in said pressure sensing passages, whereby to delay the response of said diaphragm to avoid sealing off in response to a pressure differential of short duration, comprising a split cylindrical collar band of spring ribbon metal yieldingly bearing against said cylindrical inner wall and covering said opening to restrict flow therethrough.

13. A vave as defined in claim 10, wherein each of said diaphragms is provided with a restricted bleed aperture for delayed equalization of pressure in said chambers to unseat a diaphragm that has engaged its seat in response to a pressure differential of short duration.

14. A valve as defined in claim 10, wherein each of said diaphragms has a cylindrical tubular boss integral with its central area and projecting toward said median plane, wherein said stem consists in a thin walled cylindrical tube having outwardly flanged heads at its respective ends, bearing against the inner faces of the respective diaphragms, wherein said bosses are received within the respective ends of said tube, and including plugs inserted into said bosses and expanding them into compressive engagement with the inner wall of said tube to attach the diaphragm thereto.

15. A dual leak-sealing valve comprising: a pair of diaphragms axially spaced on a common axis; a body having an inlet at one side thereof and outlets at respective ends thereof, for conveying pressure fluid, having respective diaphragm openings in opposite sides thereof, in which the respective diaphragms are received, including respective diaphragm-seating shoulders within said openings, inset inwardly of said opposite sides, on which the rims of said diaphragms are seated, a partition web having a median plane disposed in the common plane of said inlet and outlet and including a central tubular part defining an inlet chamber communicating with said inlet and having its longitudinal axis normal to said median plane and coincident with the diaphragm axis; inward pressure chambers, communicating with respective ends of said inlet chamber, being defined between said web and the respective inward faces of said diaphragms radially outwardly of said tubular part; and annular valve seats on the respective ends of said tubular part, disposed in planes parallel to and spaced axially inwardly from the planes of said diaphragm seats; and a pair of covers attached to said opposite sides of the housing body, covering said diaphragms and spaced axially outwardly therefrom to define therewith outward pressure chambers communicating with the outward faces of said diaphragms; said covers having respective rims fitted within the respective diaphragm openings, clamping said diaphragm rims against said shoulders, and sealing said chambers; said housing body further having respective L-shaped outlet passages each having an inward leg parallel to said diaphragm axis and providing communication between a respective inward pressure chamber and a respective outlet, said housing body and cover jointly having therein, pressure sensing passages each providing communication between a respective outward pressure chamber on one side of the valve and the outlet passage which communicates with the inward pressure chamber on the other side of the valve, each of said pressure sensing passages comprising a bore extending parallel to the diaphragm axis from a respective outlet to a respective one of said opposite housing sides and an L-shaped passage in a respective cover rim, communicating with the outer end of said bore and with the internal wall of said cover rim, whereby a pressure drop in one of said outlet passages will be communicated to the outward face of one diaphragm and to the inward face of the other diaphragm, resulting in a pressure differential upon both diaphragms, deflecting them in a common direction, one inwardly and the other outwardly, to establish contact of the inwardly moving diaphragm with its respective valve seat, thereby to seal off from said inlet chamber, the outlet passage in which the pressure drop has occurred.

16. A dual leak-sealing valve comprising: a pair of diaphragms; a housing in which said diaphragms are mounted at their peripheries, said housing cooperating with said diaphragms to define respective inward and outward pressure chambers for confining pressure fluid in operative communication with the inward and outward faces of said diaphragms respectively; said housing including means between said diaphragms defining a pair of valve throats and a pair of annular valve seats at the outer extremities of the respective valve throats, in inwardly spaced opposed relation to the inward faces of the respective diaphragms, said housing having inlet means for conveying pressure fluid to said valve throats and a pair of outlets for delivering pressure fluid, and having a pair of pressure sensing passages for communicating pressure fluid to respective outward pressure chambers, each of said outlets communicating through a respective pressure sensing passage with a respective outward pressure chamber and having direct free-flow communication with a respective inward pressure chamber whereby a pressure drop in one of said outlets will be immediately communicated to the inward face of a respective diaphragm, resulting in a pressure differential thereon, deflecting said respective diaphragm inwardly to establish contact thereof with its respective valve seat so as to seal off the outlet in which the pressure drop has occurred, said pressure sensing passages having flow-restricting means providing for slow bleed type of flow for delayed response of a diaphragm to a pressure drop.

17. A dual leak-sealing valve comprising: a pair of diaphragms arranged on a common axis in axially spaced relation; a body having a pair of outlets at respective ends thereof lying in a common plane, for conveying pressure fluid, having lateral inlet means disposed circumferentially between said outlets, having respective coaxial diaphragm openings in opposite sides thereof, in which the respective diaphragms are received, including respective diaphragm-seating shoulders within said openings, disposed inwardly of said opposite sides and parallel to said common plane, on which said shoulders the rims of said diaphragms are seated, including a partition web having a median plane disposed in the common plane of said inlet and outlet, and including a central tubular part defining a pair of valve throats and a pair of annular valve seats at the outer extremities of the respective valve throats, in inwardly spaced opposed relation to the inward faces of the respective diaphragms, inward pressure chambers, communicating with the respective valve seats, being defined between said web and the respective inward faces of said diaphragm radially outwardly of said valve seats; and a pair of covers attached to said opposite sides of the housing body, covering said diaphragms and spaced axially outwardly therefrom to define therewith outward pressure chambers communicating with the outward faces of said diaphragms, said covers having respective rims clamping said diaphragm rims against said shoulders and sealing said outward pressure chambers; said housing body and cover jointly having therein restricted pressure sensing passages each providing bleed-flow communication between a respective outward pressure chamber and a respective outlet passage, and said housing body further having respective outlet passages providing direct free-flow communication between respective inward pressure chambers and respective outlets, whereby a pressure drop in one of said outlet passages will be immediately communicated to the inward face of a respective diaphragm, resulting in a pressure differential thereon, deflecting said respective diaphragm inwardly to establish contact thereof with its respective valve seat, thereby to seal off the outlet passage in which the pressure drop has occurred, said bleed-flow communication providing for delayed response of a diaphragm to a pressure drop.

18. A valve as defined in claim 17, wherein each cover rim has a cylindrical inner wall, said pressure sensing passages being of L-shape, each including a leg extending outwardly parallel to the diaphragm axis and a leg extending through a respective cover rim and terminating in an opening in said cylindrical inner wall; said valve further including means for restricting flow of pressure fluid in said pressure sensing passages, whereby to delay the response of said diaphragm to avoid sealing off in response to a pressure differential of short duration, said flow restricting means comprising a split cylindrical collar band of spring ribbon metal yieldingly bearing against said cylindrical inner wall and covering the pressure sensing opening therein to restrict flow therethrough.

References Cited in the file of this patent

UNITED STATES PATENTS

| | | |
|---|---|---|
| 2,930,391 | Bass | Mar. 29, 1960 |
| 2,944,856 | Swanson | July 12, 1960 |